(12) United States Patent
Mangone, Jr.

(10) Patent No.: US 7,849,590 B2
(45) Date of Patent: Dec. 14, 2010

(54) FASTENING APPARATUS AND SYSTEM

(76) Inventor: Peter G. Mangone, Jr., 2113 Montane Dr., Golden, CO (US) 80401

( * ) Notice: Subject to any disclaimer, the term of this patent is extended or adjusted under 35 U.S.C. 154(b) by 1155 days.

(21) Appl. No.: 11/465,064

(22) Filed: Aug. 16, 2006

(65) Prior Publication Data
US 2008/0047124 A1 Feb. 28, 2008

(51) Int. Cl.
*B23Q 7/10* (2006.01)
*B23P 11/00* (2006.01)
(52) U.S. Cl. .................... 29/811.2; 29/525.1
(58) Field of Classification Search ............. 29/525.01, 29/809, 811.2, 270, 243.5, 243.56, 453, 505, 29/451, 521, 434, 446; 24/543, 489, 516, 24/494, 498, 513, 518, 545; 140/53, 57; 16/225
See application file for complete search history.

(56) References Cited

U.S. PATENT DOCUMENTS

| | | | |
|---|---|---|---|
| 5,350,267 A | 9/1994 | Mangone, Jr. | |
| 5,497,893 A | 3/1996 | Mangone, Jr. | |
| 6,298,549 B1 | 10/2001 | Mangone, Jr. | |
| 6,606,786 B2 | 8/2003 | Mangone, Jr. | |
| 6,779,241 B2 | 8/2004 | Mangone, Jr. | |
| 2003/0218046 A1 | 11/2003 | Mangone, Jr. | |
| 2005/0028346 A1 | 2/2005 | Mangone, Jr. | |

FOREIGN PATENT DOCUMENTS

DE  3535942 A1  4/1987

*Primary Examiner*—John C Hong
(74) *Attorney, Agent, or Firm*—Drinker Biddle & Reath LLP

(57) ABSTRACT

An apparatus for confining in a fastening member articles resting on a surface including a housing with a cavity for holding an open fastening device and a control arm linked to first and second members, the control arm being movable between a start position and an end position to successively actuate the first and second members. The first member is adapted to contain and lift the article into position to await delivery of the open fastening device and the second member is adapted to deliver the open fastening device to the article and to close the fastening device to confine the article. In one important embodiment, the first member is also adapted to raise the apparatus away from the surface.

25 Claims, 12 Drawing Sheets

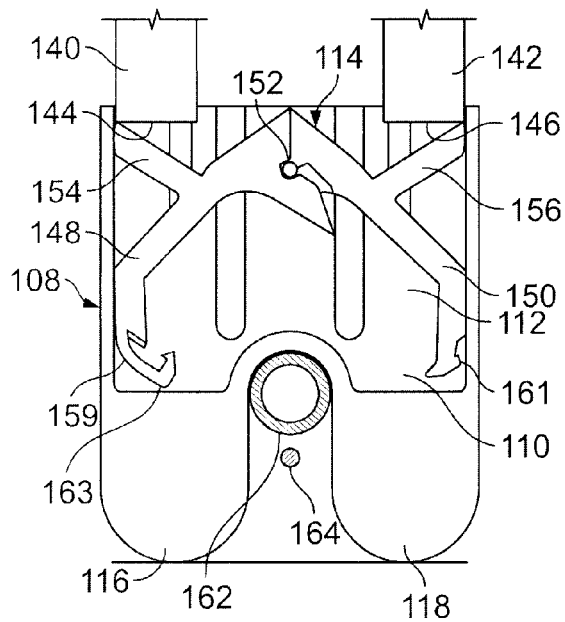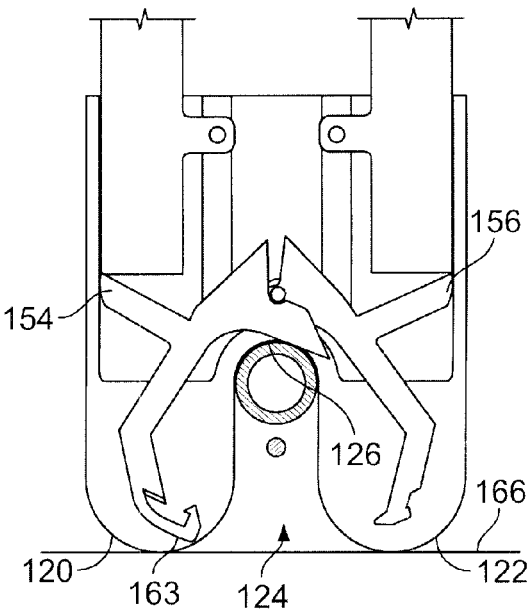
FIG. 4A     FIG. 4B
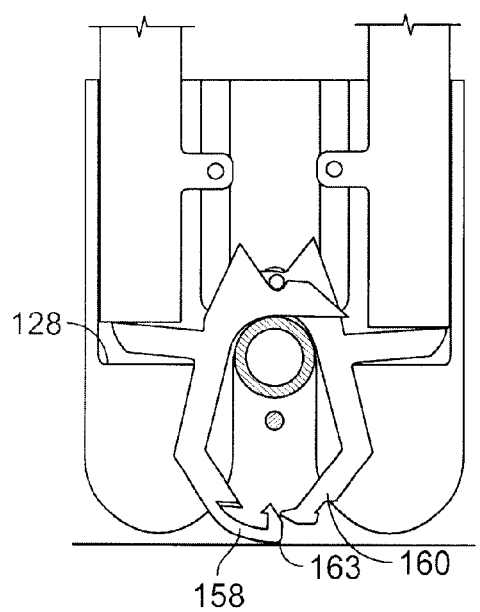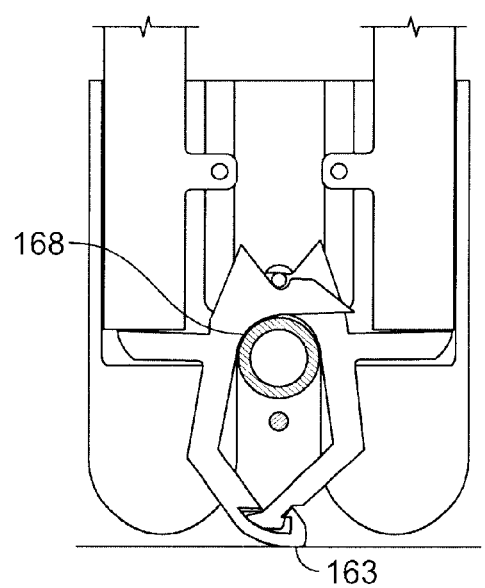
FIG. 4C     FIG. 4D

FASTENING APPARATUS AND SYSTEM

FIELD OF THE INVENTION

This invention relates generally to an apparatus and a method for fastening at least two articles to one another and, more particularly, to an apparatus and a method for rapidly and efficiently lifting, delivering and confining in an adjacent relationship within a fastening device and then fastening portions of at least two relatively rigid, generally cylindrical articles.

BACKGROUND OF THE INVENTION

It is sometimes necessary to confine portions of relatively rigid generally cylindrical articles in a close relationship during the formation of a final product, so that relative movement is limited while the final product is being formed. For example, when radiant heating tubing is to be provided within a concrete driveway, a supporting network in the form of a wire mesh is laid in place and radiant heating tubing is then attached to the wire mesh as it is advanced over portions of the wire mesh in a desired, usually serpentine, relationship. Conventionally, this attachment is accomplished with wire ties or nylon ties that are wrapped around portions of the wire mesh and adjacent portions of the radiant heating tubing before the concrete is poured and cures to form the driveway. Where additional strength is required, conventional rebar may be added to the wire mesh or used in place of the wire mesh. In other types of construction, where conventional rebar is used to strengthen structures made of concrete, rebar sections are attached together using conventional ties as or before they are moved into the desired location before pouring the concrete to form the structures.

The application of such conventional ties is backbreaking work that is time consuming and can produce unreliable inconsistent results where ties are attached in a haphazard way or even are skipped to minimize the labor. Also, in some applications a polystyrene foam board is placed below the tubing and mesh. Prior tools for applying fastening devices to attach tubing to supporting networks fail to deliver consistently satisfactory results, frequently jam, and risk damaging the tubing (and the foam board where used), and impairing the functionality of the tubing. Also, prior tools cannot tolerate irregularities in the underlying surface or a soft substrate like foam board and are slow and cumbersome to use.

Fastening devices in the form of locking clips that are particularly suitable for the above applications were recently developed by the present inventor, Peter G. Mangone, Jr., and are described in his U.S. Pat. Nos. 6,298,549; 6,606,786; and 6,779,241, the teaching and contents of which are incorporated herein by reference. The locking clips described in these patents (referred to in the above-noted patents as "devices for forming an enclosure"), may be generally described with reference to FIG. 1.

Thus, the locking clips 10 of FIG. 1 include two side members, 12 and 14, having respective inner and outer side faces, 12A, 12B, 14A, and 14B. The two side members are generally curved as shown and have upper body portions 16 and 18 that are pivotally connected by a pivot member 20. Side members 12 and 14 have abutment portions 22 and 24 extending outwardly from the outer side faces of each of the members. Inwardly pivoting motion is achieved by applying a generally downward force to the top surfaces 34 and 36 of each of abutment portions 22 and 24 as the locking clips come into contact with the tubing (as shown for example in FIGS. 4B to 4D below).

Pivot member 20 may be a living hinge (as shown) or it can be another pivoting member as described in the above-noted patents. The pivot member clearance area 38 enables pivotal motion of the side members in substantially parallel planes from an open/receiving position to a closed/locked position. The side members are designed to lock in the closed position by way of locking portions at or near the distal ends of the side members. Preferably, once engaged the locking portions will be irreversibly locked. The locking portion of one of the two members may comprise a flexible end portion such as shown at 26 including a recess 30. The locking portion of the other of the two members may have a protruding end portion such as shown at 28 with a hook portion 32 configured to mate with recess 30, where the flexible end portion and the protruding end portion are located and configured so that application of force on the abutment portions moves the locking portions together whereupon hook member 32 enters recess 30 to irreversibly mate the locking portions. Other closing or locking configurations can be used.

Inner side faces 12A and 14A of members 12 and 14 define a fully circumscribed opening 168 (FIG. 4D) when the side members are in the locked position. The details of the locking member of FIG. 1 as well as other locking members are described in the aforementioned '549, 786 and '241 patents which, as indicated earlier, are incorporated by reference. Also, it should be noted that the present invention may be used with other fastening device designs so long as the fastening devices include interlocking pivoting side members and abutment portions for applying an inwardly closing force to the side members.

The '549, '786 and '241 patents describe an apparatus for moving a locking clip such as that of FIG. 1 from the open position to the closed position, to enclose, for example, at least two relatively rigid articles using a tool. The tool described includes a feed track that supports a row of locking clips in their open position and urges the locking clips toward an end plate of the tool where the leading locking clip is urged against the end plate. The end plate has a generally planer surface and a guide projecting outwardly from the planer surface toward the row of clips. The guide includes the first guiding surface and, spaced therefrom, a second guiding surface. In the tool, the clips are urged against the end plate so that a portion of at least one of the two members of the clip is facing one of the first and second guiding surfaces and a portion of the other of the two members is facing the other of the first and second guiding surfaces.

The above tool has means as described in the patents for applying force to the abutment portions of the spaced apart portions of the clip. The force applying means of this prior art apparatus is located relative to the abutment portions so that the force applying means contacts the abutment portions of the clips to move them from the opened position to the closed position confining the two relatively rigid members between the inner surfaces of the clip.

The present invention is directed to an improved apparatus and method for confining portions of at least two relatively rigid, generally cylindrical articles in an adjacent relationship using a fastening device with interlocking pivoting members movable from an opened position to a closed position. The apparatus and method: 1) contain and lift the articles away from the surface on which they rest; 2) raise the body of the apparatus away from the surface; 3) deliver the fastening device into position to confine the articles; 4) safely and efficiently secure the fastening device in the closed position about the articles; and 5) expeditiously release the closed fastening device and articles from the apparatus.

BRIEF DESCRIPTION OF THE DRAWINGS

FIGS. 4A-4D are representations of the distal end portion of an apparatus in accordance with the present invention showing various stages in the clip closing and locking operation of the apparatus;

DETAILED DESCRIPTION OF THE INVENTION

Figure 2:
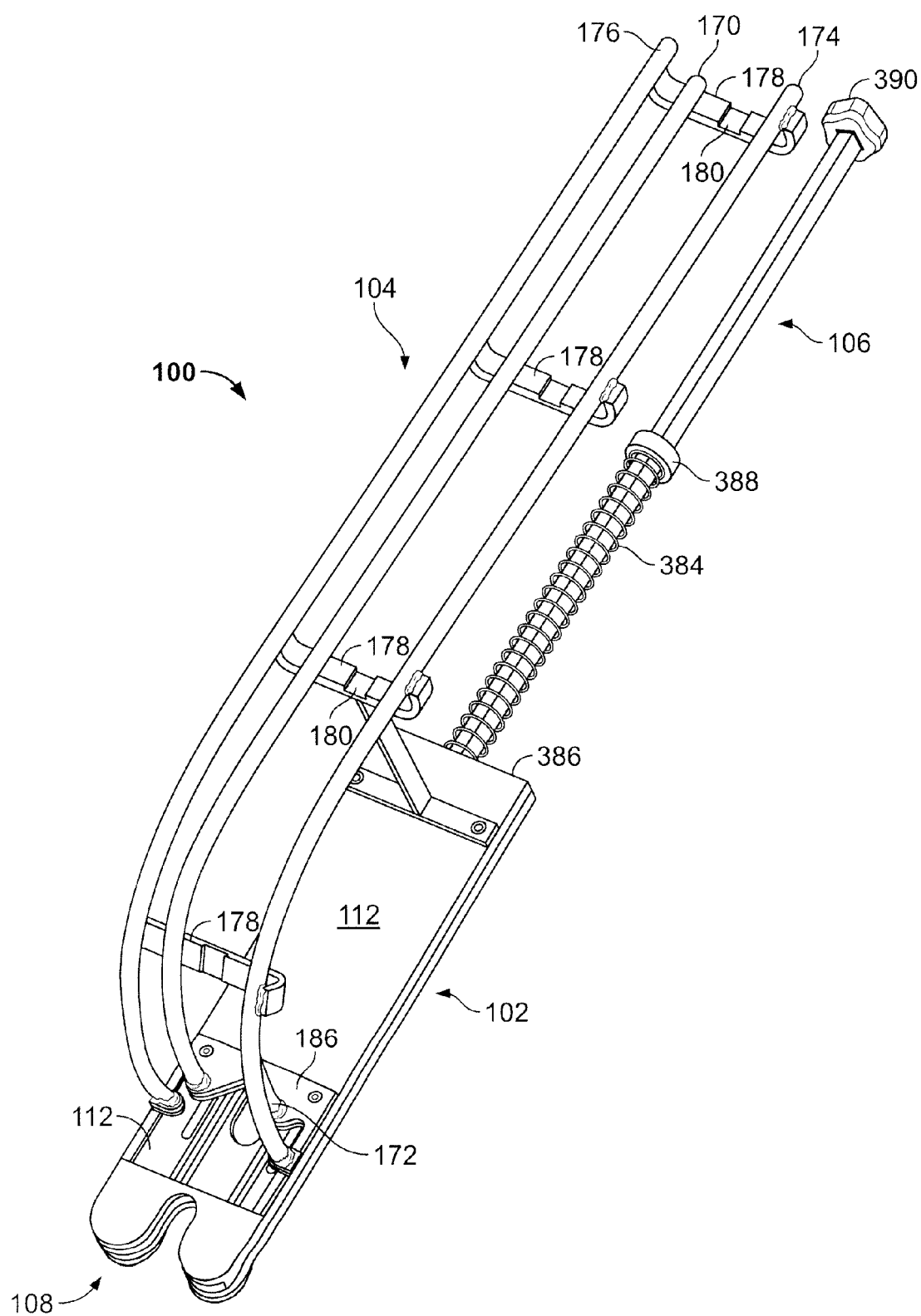
FIG. 2 is an elevation view of the back of an apparatus in accordance with the present invention.
Figure 3:
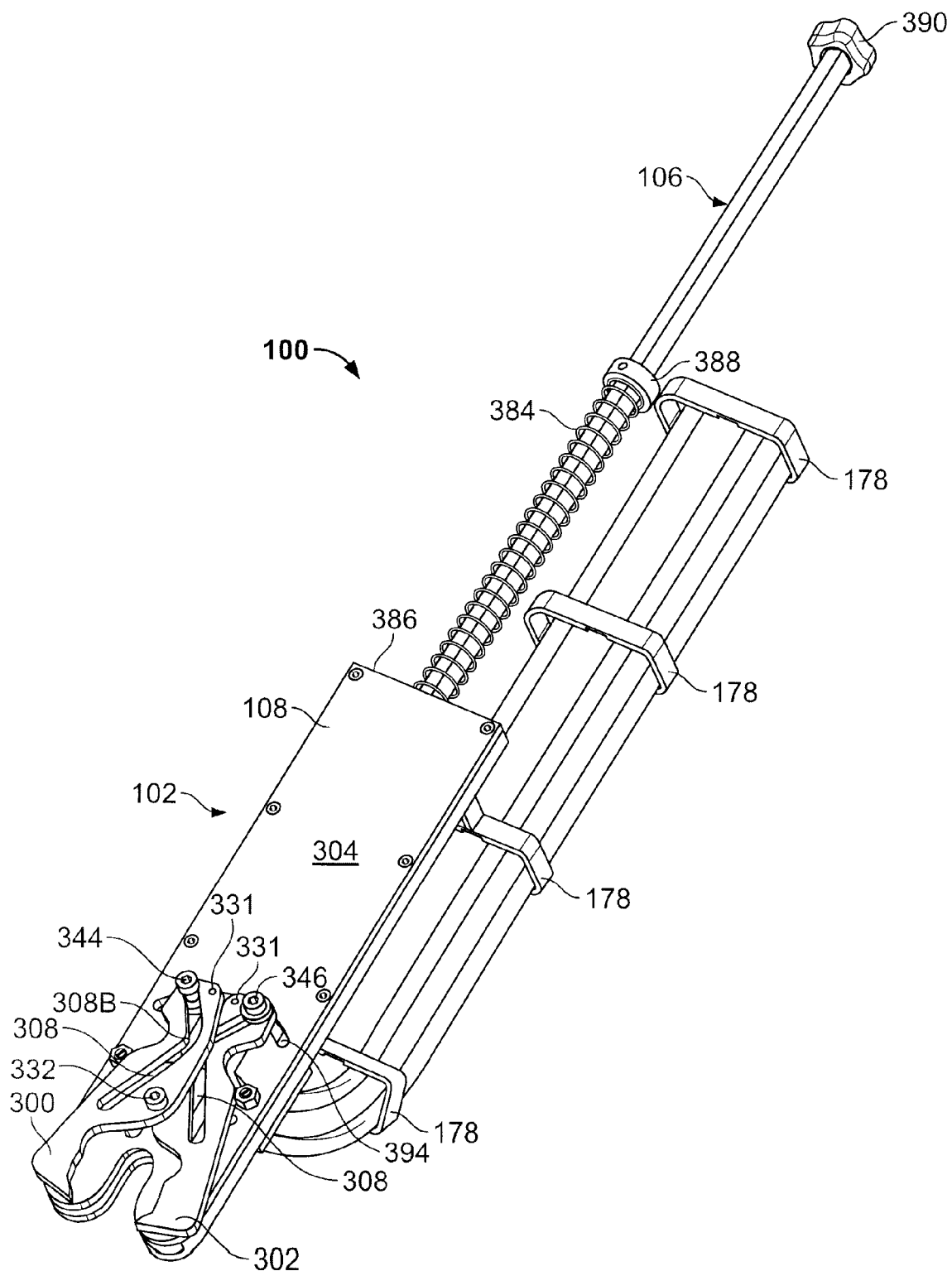
FIG. 3 is a front elevation view of the front of an apparatus in accordance with the present invention.

A complete grasping and fastening apparatus 100 in accordance with the invention is illustrated in FIGS. 2 and 3. Apparatus 100 includes an application section or housing 102 that includes means as described below for containing and lifting relatively rigid generally cylindrical articles away from the surface supporting the articles, raising the body of the apparatus, delivering a locking clip into position to confine the articles, securing the clip in the closed position, and releasing the locking clip and articles from the apparatus. The apparatus also includes a magazine 104 for holding a plurality of locking clips and feeding those clips into the application section. Finally, the apparatus includes a push rod 106 for actuating the application section and carrying out the method of the invention.

Figure 10:
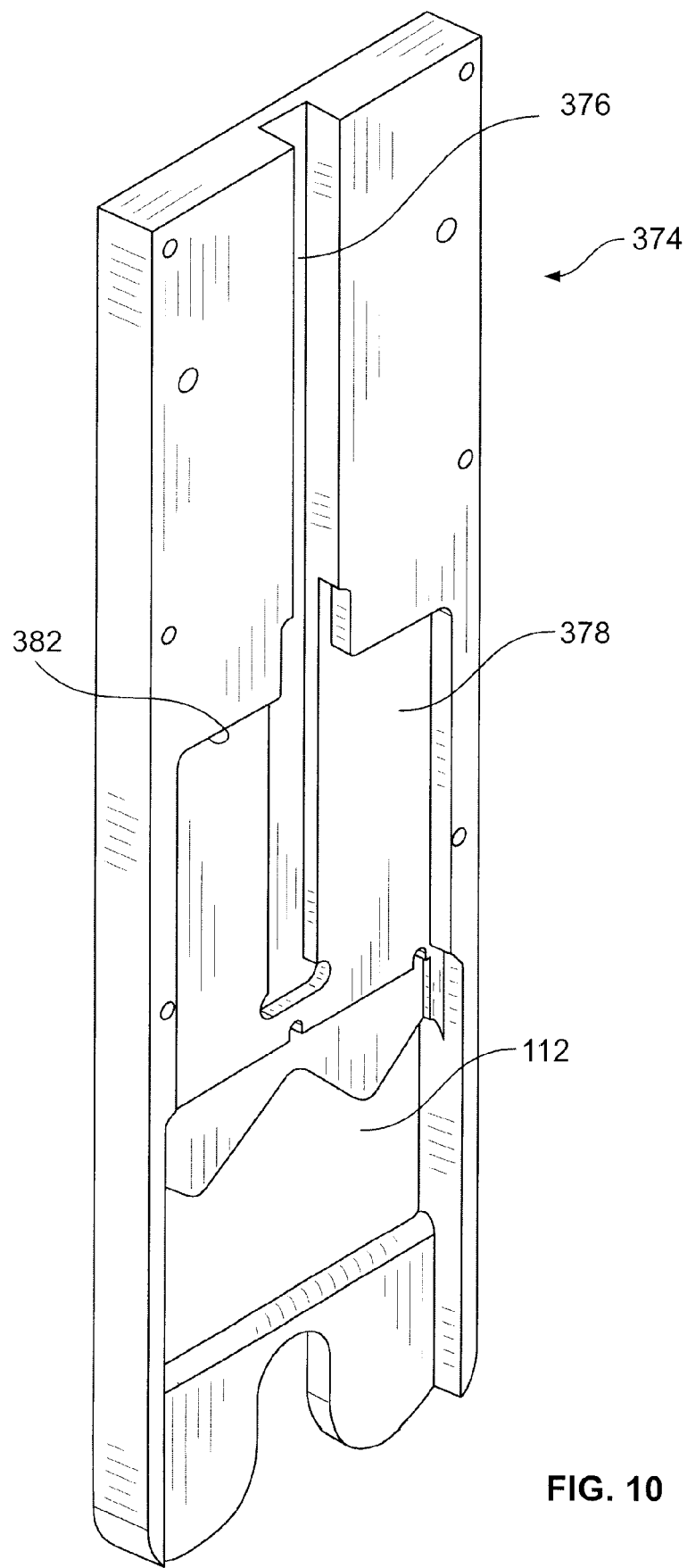
FIG. 10 is a back perspective view of a body plate of an application section of an apparatus which may be used in accordance with the present invention.

The clip closing and locking operation of fastening apparatus 100 of the present invention is illustrated in FIGS. 4A-4D. These figures represent a view of the distal end portion of body 108 of the application section. As shown in these figures, body 108 includes a cavity 110 in its outer surface 112 in which a leading locking clip 114 is shown positioned and ready to be closed and locked, and fingers 116 and 118 at the end of the application section. Cavity 110 includes a lower sill 128. It also has an upper boundary 130 that is scalloped to clear the upper edge of the clip (as shown in FIG. 10) to enable successive clips to enter into cavity 110. In FIGS. 4A-4D, the scalloped upper boundary has been removed to help illustrate the clip closing and locking operation.

Figure 10A:
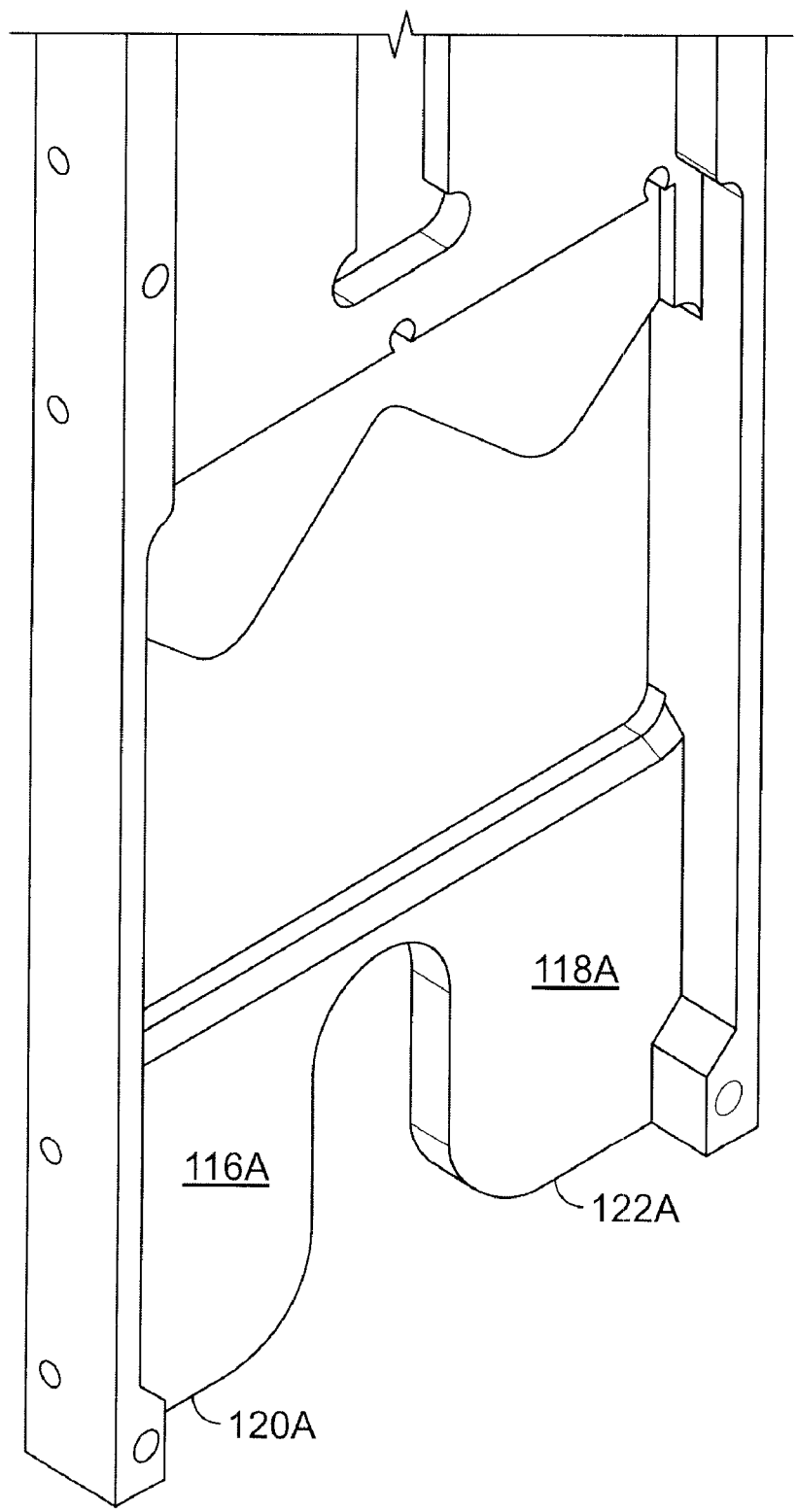
FIG. 10A is a partial back perspective view of an alternative application section of an apparatus that may be used in accordance with the present invention in which fingers with broad flat ends are used.

Fingers 116 and 118 include radiused distal ends 120 and 122 separated by a cavity 124. In the illustrated embodiment, the curved edges of the fingers gently curve into cavity 124 which is radiused at its top 126. In alternative embodiments, cavity 126 may be of other configurations. Also, distal ends 120 and 122 of fingers 116 and 118 may be of other configurations. For example, the fingers may taper downwardly to form a sharp point, a narrow flat tip, a broad flat end, or the distal ends of the fingers may be of other shapes, as desired. One such alternative design is shown in FIG. 10A where fingers 116A and 118A have broad flat ends 120A and 122A.

FIGS. 4A-4D show a portion of arms 140 and 142 of driver 138, which is more fully described and illustrated in connection with FIGS. 9A-9B. Arms 140 and 142 each have leading faces 144 and 146. Clip 114 includes outer members 148 and 150 pivotally connected at their proximal end by a pivot member in the form of a living hinge 152. The outer members have abutment portions 154 and 156 projecting generally outwardly from the outer surfaces of each of the clip members for engagement by leading flat faces 144 and 146 of driver 138. Additionally, the distal ends of the clip members have first and second interlocking portions 158 and 160. Finally, the outer leading edges 159 and 161 of the outer members are curved toward the centerline of the clip.

Turning now to FIG. 4A, clip 114 is shown ready for application, with driver arms 140 and 142 adjacent to abutment portions 154 and 156. Two relatively rigid generally cylindrical articles are shown in cross section in the area between the clip arms in the form of rubber radiant heating tubing 162 (e.g., PEX tubing) and steel wire mesh 164. The top of the cavity 126 in this preferred embodiment has a radius generally corresponding to the outer radius of the upper radiant heating tubing 162 enabling it to rest snugly at the top of the cavity. Finally, distal ends 120 and 122 of fingers 116 and 118 are shown resting against a generally flat surface 166 such as a polystyrene foam board on the surface of a driveway before application of concrete (not shown) which is to cover the radiant heating tubing and wire mesh. It should be noted that in many applications the supporting surface will be irregular or strewn with aggregate or debris.

In FIG. 4B, driver arms 140 and 142 are shown partially advanced to move the clip downwardly (past a detent as will be explained in further detail below), placing it in an ideal position vis à vis the wire mesh and radiant heating tubing which has been lifted up into cavity 124 in an earlier step in the use of the apparatus. As can be seen in this figure, the inner surface of the clip engages the radiant heating tubing to limit further downward movement of the clip.

Next, in FIG. 4C, the driver is shown advanced further downward with arms 140 and 142 pressing against abutment portions 154 and 156 causing outer members 148 and 150 to pivot inwardly until interlocking portions 158 and 160 just touch. As can be seen in this figure, the interlocking members clear surface 166 below the fingers.

Finally, in FIG. 4D, clip driver 138 is shown advanced to its lowermost position, causing the interlocking portions to irreversibly interlock as shown. This produces a fully circumscribed opening 168 between the outer members, confining the radiant heating tubing and wire mesh in an adjacent relationship. In a preferred embodiment, corners 163 of the clips are rounded to minimize the likelihood that the clips will catch on the supporting surface or debris present thereon as the side members pivot inwardly to the closed position.

In practice, the steps of 4A through 4D are preferably performed in a continuous, even motion. (Indeed, as discussed below, the full range of the operation of apparatus 100 is preferably accomplished with continuous, even motion.) Also, the size of the clip in its closed position vis a vis the outer diameters or cross-sections of the confined articles will determine how snugly the confined articles are held in the confining opening. Therefore, if a snugger fit is desired, a smaller clip will be used. Finally, while the present invention is considered ideal for use in confining relatively rigid generally cylindrical articles (like rubber hose, wire, metal rods, etc.) in an adjacent relationship, it may be used with articles of other shapes and indeed, it may also be used with articles that are not relatively rigid.

Figure 5:
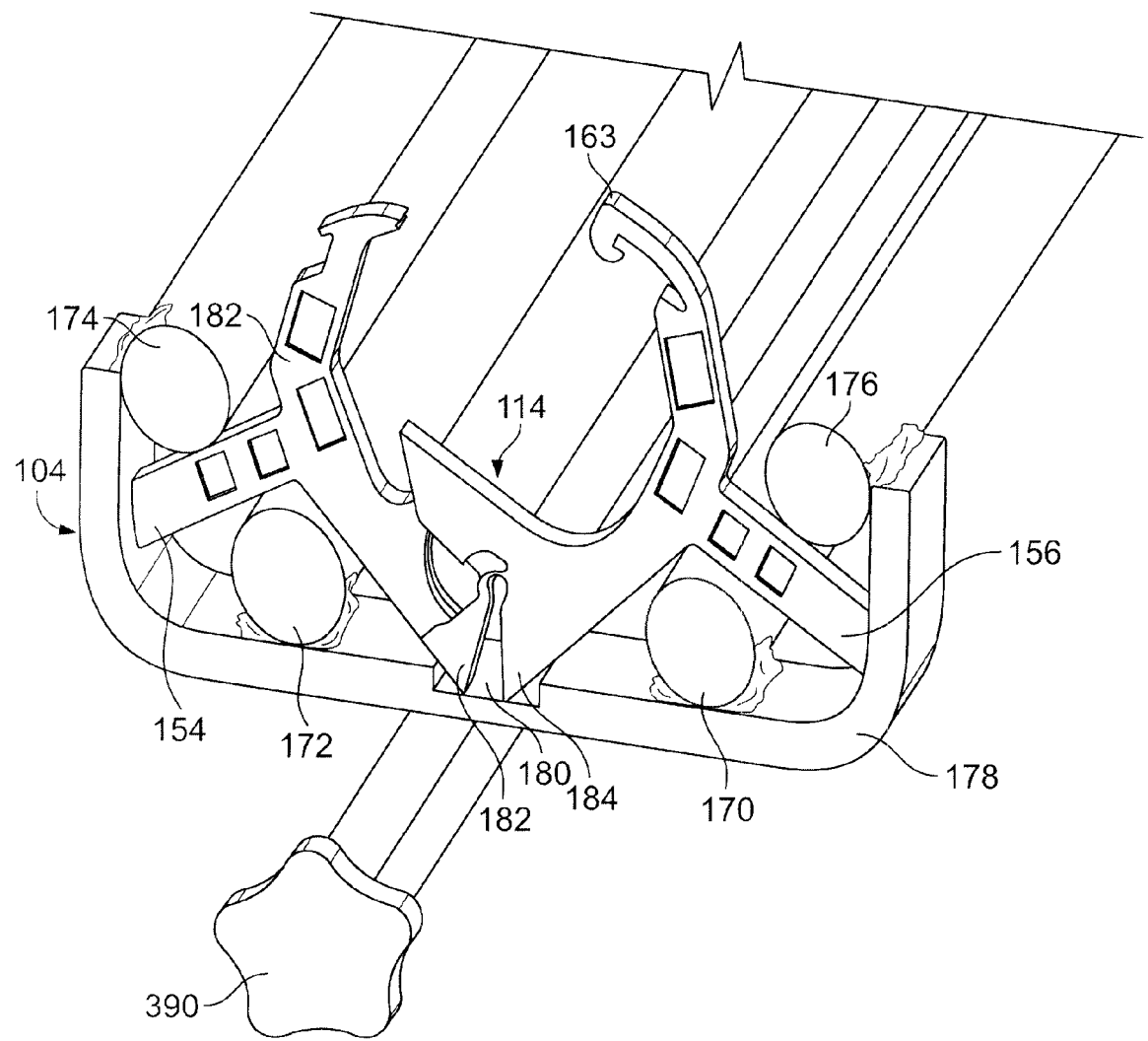
FIG. 5 is a partial top perspective view of a clip holding magazine of an apparatus in accordance with the present invention.

FIG. 5 is a top view of magazine 104 of apparatus 100. In this view, inner tube supports 170 and 172 and outer tube supports 174 and 176 are seen in end view, welded to tube supports 178. Tube supports 178 include notches 180 to provide clearance for the clips as they are inserted and move into position as the magazine is loaded. Thus, one such clip 114 is shown in FIG. 5 with the proximal tips 182 and 184 of each of its outer members 148 and 150 resting in notch 180 and abutment portions 154 and 156 resting in the space between the pairs of adjacent inner and outer support tubes. A series of clips (not shown) will be loaded into the magazine so that they slide down along the inner and outer tube supports with the leading clip resting in application section 102 and succeeding clips abutting each other and extending upwardly from the end of the magazine along the inner and outer support members. This insures a supply of clips which can be quickly applied in successive locations as desired by the tool operator. While the clips will move into place and remain ready to be fed into the apparatus under the force of gravity, the clips may also be positioned and fed by applying a spring loading (not shown) against the topmost clip in the magazine.

Figure 6A:
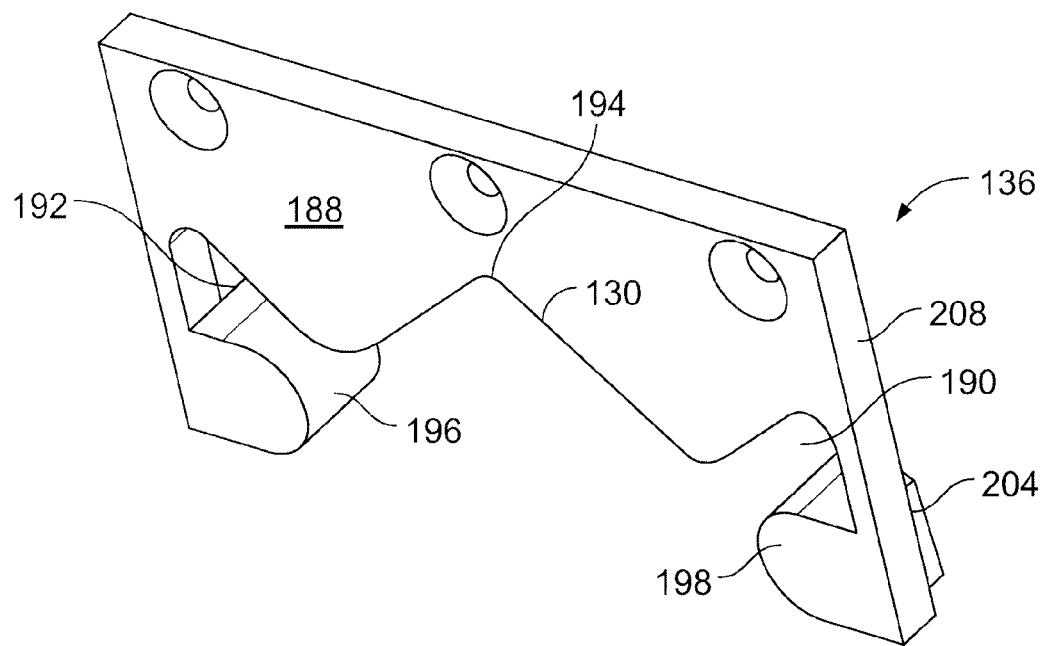
FIGS. 6A and 6B are respectively front and back views of the bottom plate of the magazine of FIG. 5.
Figure 6B:
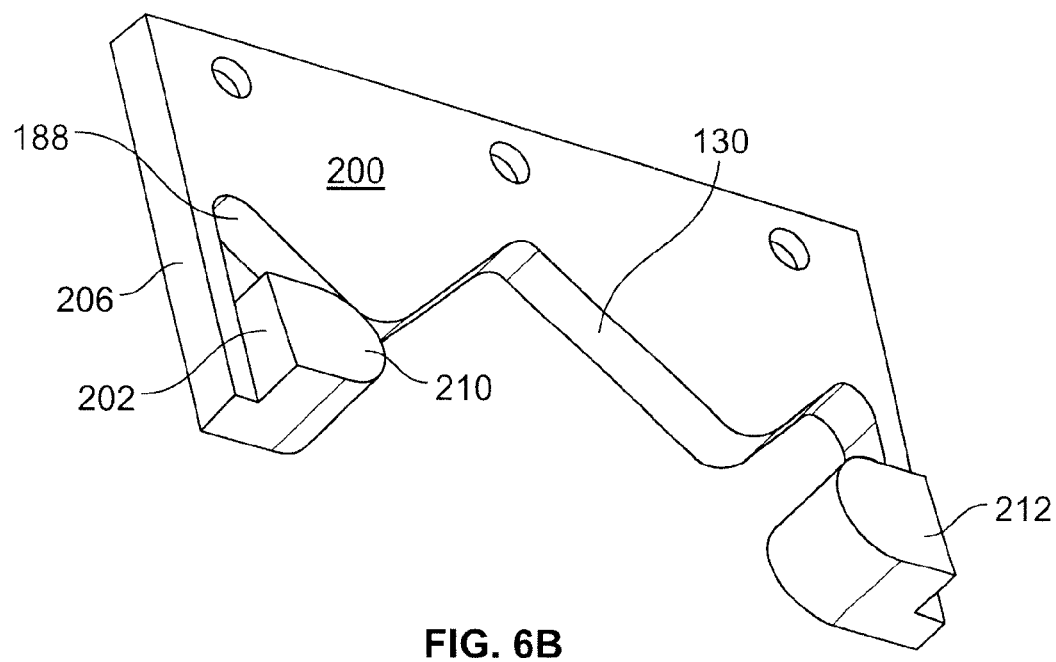

As can be seen in FIG. 2, the magazine tube supports are fastened (for example by welding as shown) to a bottom plate 186 that is attached to the outer surface 112 of body 108 of the application section. Bottom plate 186 is shown in front and back views respectively in FIGS. 6A and 6B. Thus, the front surface 188 of the bottom plate is generally flat and includes holes for accepting screws for attaching the plate to the outer surface 112 of the application section. The plate is scalloped along its upper boundary 130 to admit clips past the plate into the body of the application section, with clip abutment portions 154 and 156 passing through slots 190 and 192 in the plate and the top of the clip clearing the central scallop at point 194. Finally, plate 186 includes two inwardly directed fingers 196 and 198 which protrude from the back surface 200 of the plate. These fingers have flats 202 and 204 set back from the outer edges 206 and 208 of the plate to facilitate positioning of the plate in cavity 110 of the application section. The generally flat back faces 210 and 212 of fingers 196 and 198 are spaced from back cover 304 (FIG. 11) and cooperate with detents 370 located opposite the finger faces to hold successive clips in place until needed, as will be explained below.

Figure 7:
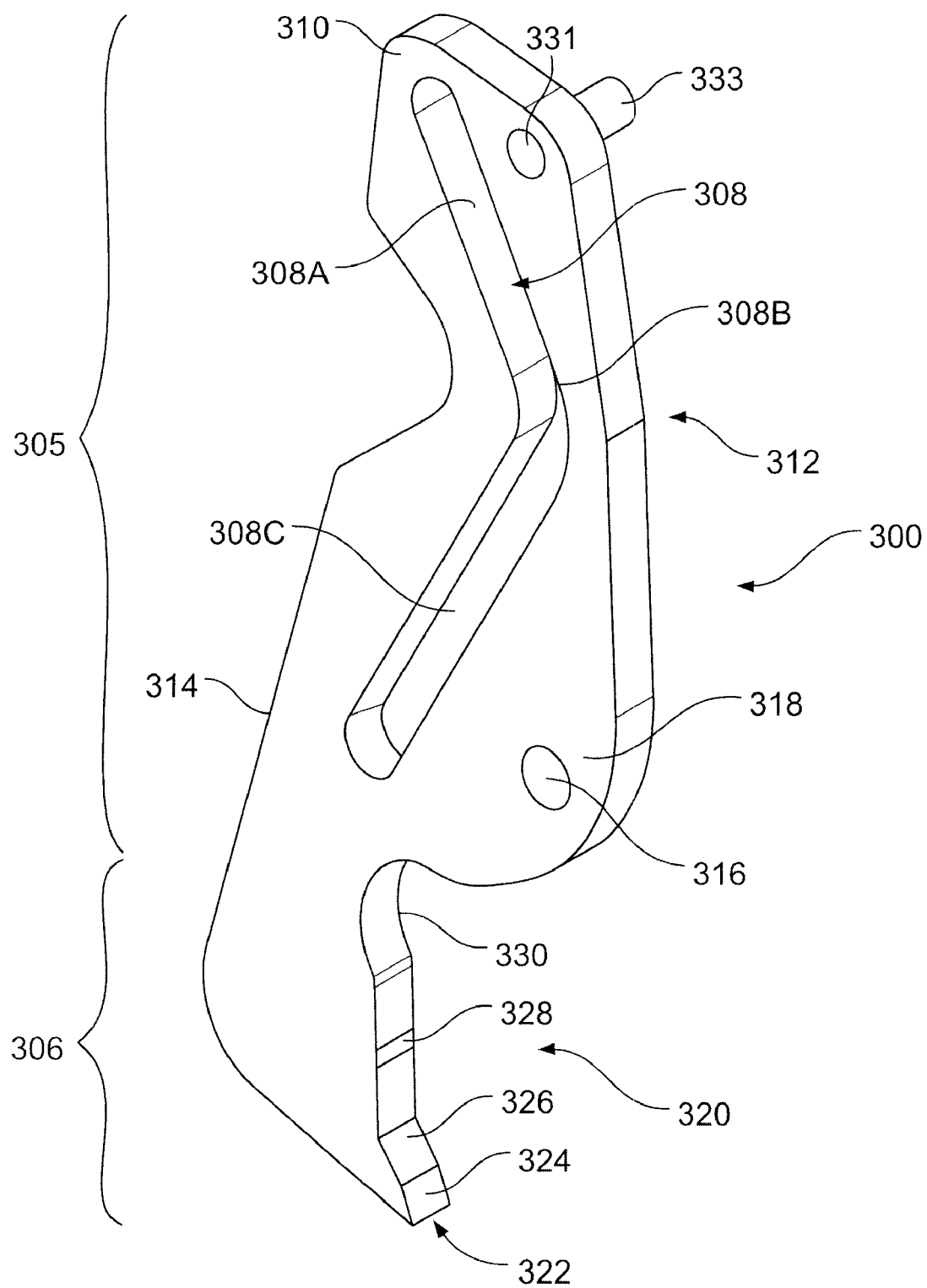
FIG. 7 is a perspective view of a grabber arm which may be used in the apparatus of FIGS. 1 and 2.

Turning the apparatus over to the view shown in FIG. 3, two overlapping grabber arms 300 and 302 are shown pivotally attached to cover 304 of body 108 of application section 102. Each of the grabber arms is a generally identical mirror image of the other. Thus, a representative grabber arm 300 is illustrated in FIG. 7 and includes a control section 305 and a lifting section 306. The control section has a broad generally V-shaped slot 308 which runs from the top outer corner 310 of the grabber arm to the mid-inner surface 312 of the control section and back toward the bottom outer edge 314 of the control section. A pivot hole 316 is positioned in the lower inner corner 318 of the control section.

Figure 1:
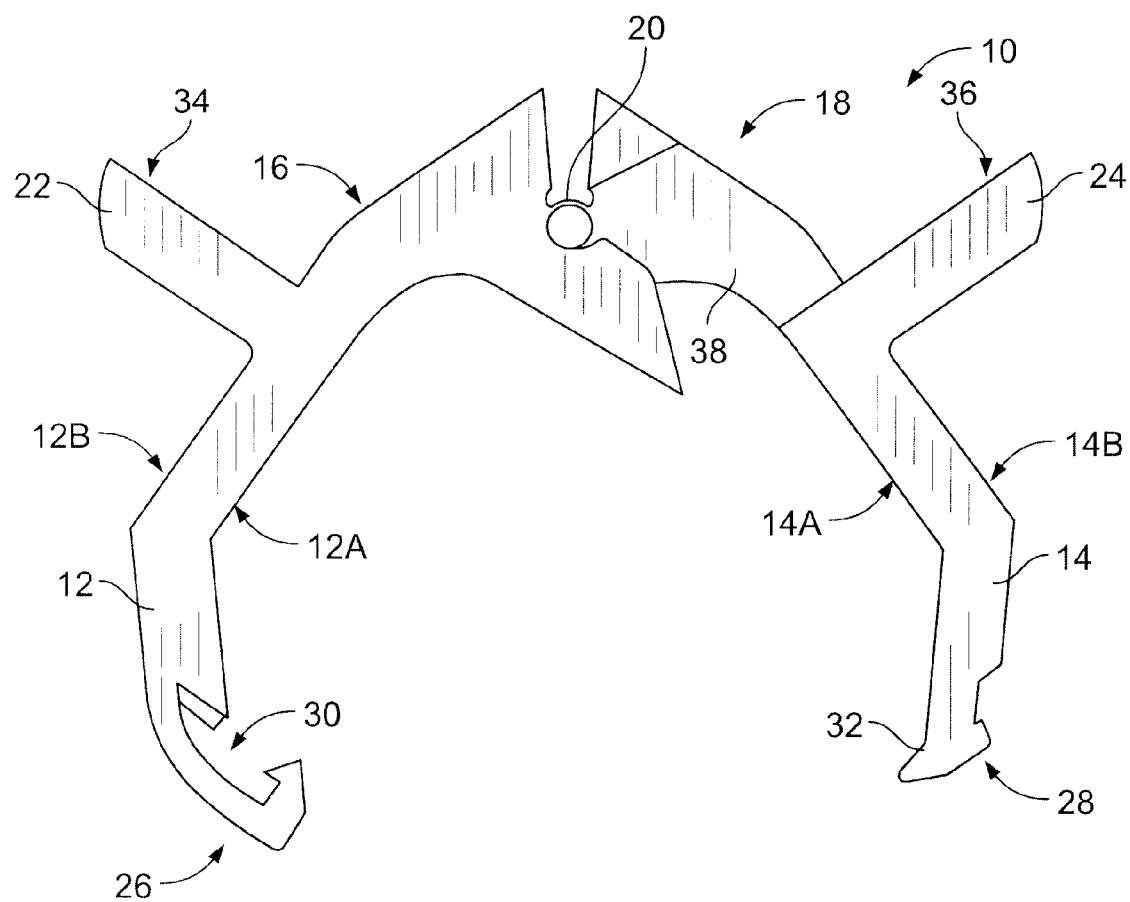
FIG. 1 is a front elevation view of a prior art locking clip which may be used in the practice of the present invention.

Lifting section 306 includes a guide surface 320 beginning with a chiseled end 322 having a leading bevel 324, followed by a trailing bevel 326 and a generally curved surface 328 leading to a radiused opening 330. (In the illustrated embodiment, opening 330 is dimensioned to accept tubing 162). Ends 322 may be radiused or beveled to minimize potential interference with substrates like polystyrene foam board. The grabber arms are mounted for overlapping pivotal movement by a pivot pin 332 (FIG. 3) that passes through the pivot holes 316 of the two grabber elements. Also, bore 331 accepts a guide pin 333 that engages arcuate slot 394 (FIGS. 1 & 11) in the cover of the application section.

The action of the grabber arms 300 and 302 is illustrated in FIGS. 8A-8D. Thus, apparatus 100 is positioned on surface 166 bearing articles (not shown) that are to be confined in a clip to be applied with the device. As a downwardly directed force is applied to the apparatus (as described below), the grabber arms pivot inwardly to the position shown in FIG. 8B, so that chiseled ends 322 clear the inner edge 334 running along cavity 124. The chisel tips of the grabber arms are thus poised to initially engage the larger diameter heating tubing 162 (FIG. 4A). The grabber arms continue pivoting to ride under the wire mesh below the tubing reaching the position shown in FIG. 8C where the chisel tips are opposite each other.

Figure 8A:
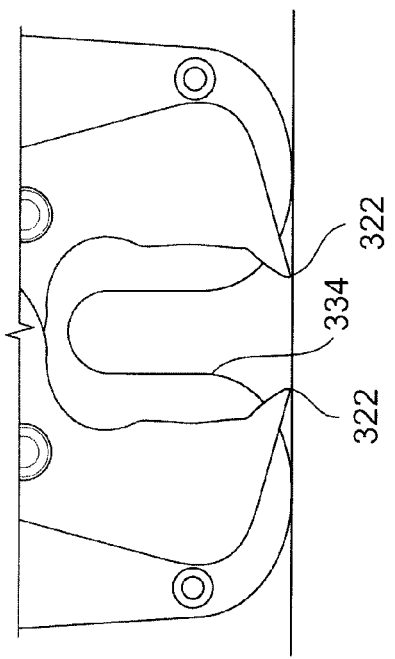
FIGS. 8A-8D are representations of the action of grabber arms which may be used in the practice of the present invention.
Figure 8B:
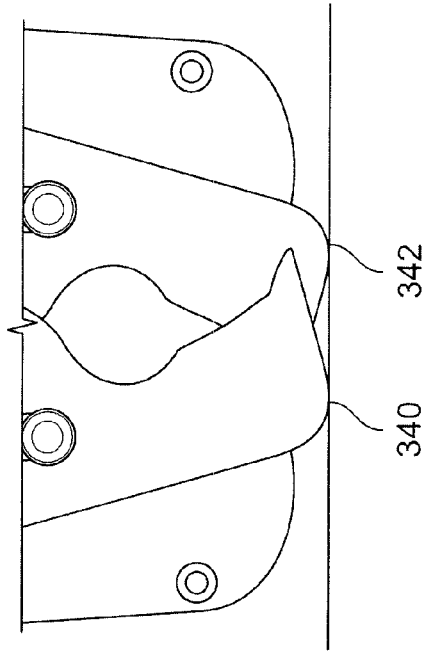
Figure 8C:
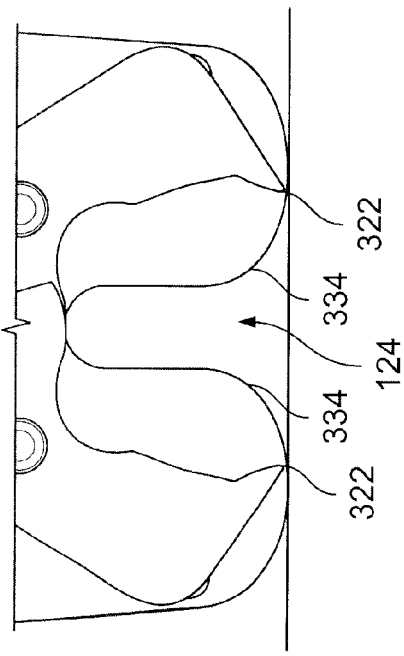
Figure 8D:
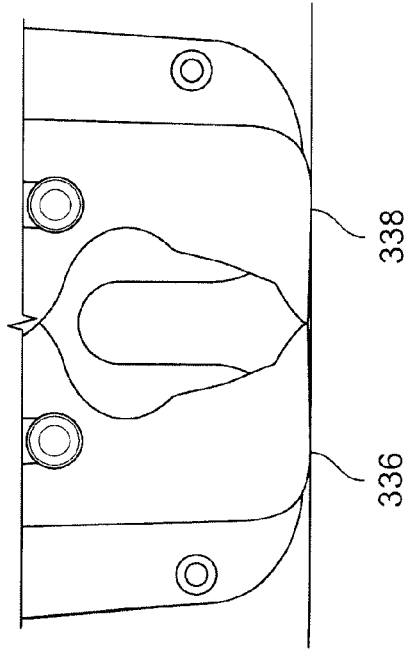

At this point, the grabber arms contain the heating tubing and wire mesh portions which have been lifted away from surface 166 by the scissors action of the grabber arms. The articles are then held in a capture area between the grabber arms, above the inwardly directed distal ends of the grabber arms. As can also be seen in this figure, the grabber arms have begun to lift the entire apparatus away from supportive surface 166 through the pivoting action of their bottom edges 336 and 338 against the supporting surface. The grabber arms continue pivoting to their final fully closed position as shown in FIG. 8D where the corner radii 340 and 342 of bottom edges 336 and 338 lift the apparatus to its maximum spacing from the support surface. This lifting action facilitates the scissors action of the grabber arms as they sweep around to their fully closed position and provides clearance from debris or aggregate on the supporting surface. Also, the corner radii provide secure footing for the apparatus on irregular supporting surfaces.

The pivoting movement of grabber arms 300 and 302 is achieved by the cooperation of pivot pin 332 and the movement of link pins 344 and 346 that are attached to bores 360 and 362 of clip driver 138. The clip driver thus moves the pins in slots 308 of each of the grabber arms as it also operates on clip 114. The link pins are in the location depicted in FIG. 3 when the grabber arms are positioned as shown in FIG. 8A. As the link pins move downwardly in slots 348 and 350 of body cover 304 (FIG. 11) they also engage the first leg 308A of slot 308 of the grabber arms causing the arms to pivot inwardly through the stages depicted in FIGS. 8A-8C, as the slots are re-oriented to follow the movement of the link pin. This continues until the grabber arms reach the position depicted in FIG. 8D and the link pins reach the transition point 308B in the slots. At the transition point, the second legs 308C of the slots will be aligned with slots 348 and 350, so that further downward movement of the link pins will not produce further pivoting action of the grabber arms and will ensure that the grabber arms remain in the position depicted in FIG. 8D.

Figure 9A:
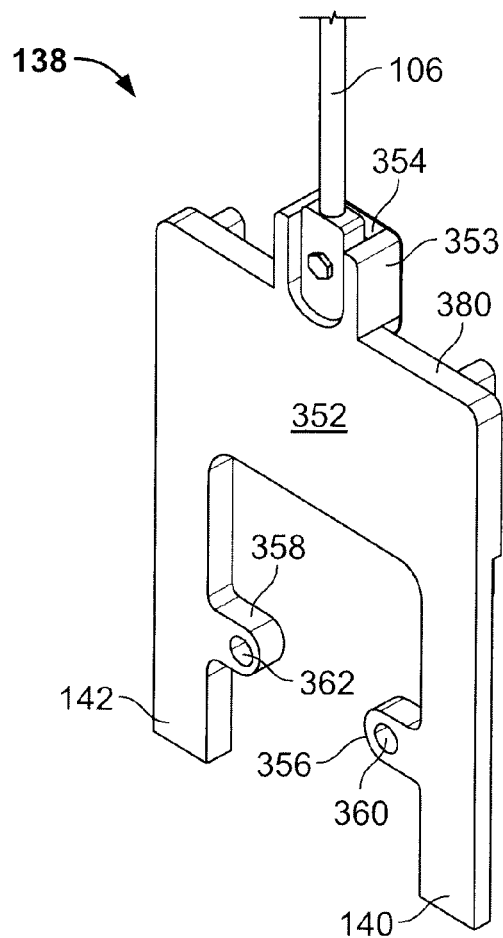
FIGS. 9A and 9B are respectively front and back perspective views of a clip driver which may be used in the practice of the present invention.
Figure 9B:
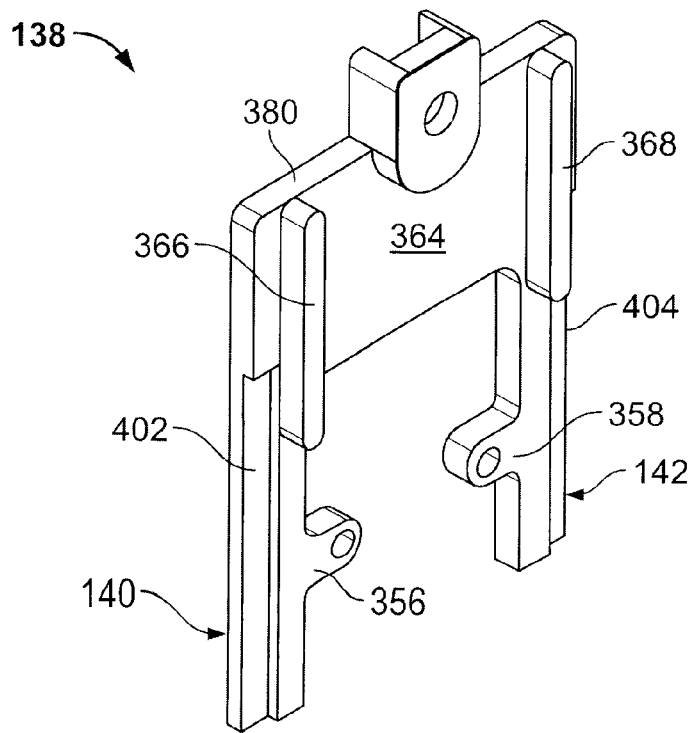

FIGS. 9A and 9B illustrate respectively the front and back surfaces of driver 138. As can be seen from the FIG. 9A, the back surface 352 of driver 138 is generally flat. An attachment member 353 extends upwardly from the top of the driver and has a recess 354 for receiving and attaching the distal end of push rod 106 to the driver. Driver 138 has two downwardly directed arms 140 and 142, and ears 356 and 358 that project into the space between the arms. These ears have threaded bores 360 and 362 that accept threaded link pins 344 and 346 to operate the grabber arms as described above.

Figures 11, 11A:
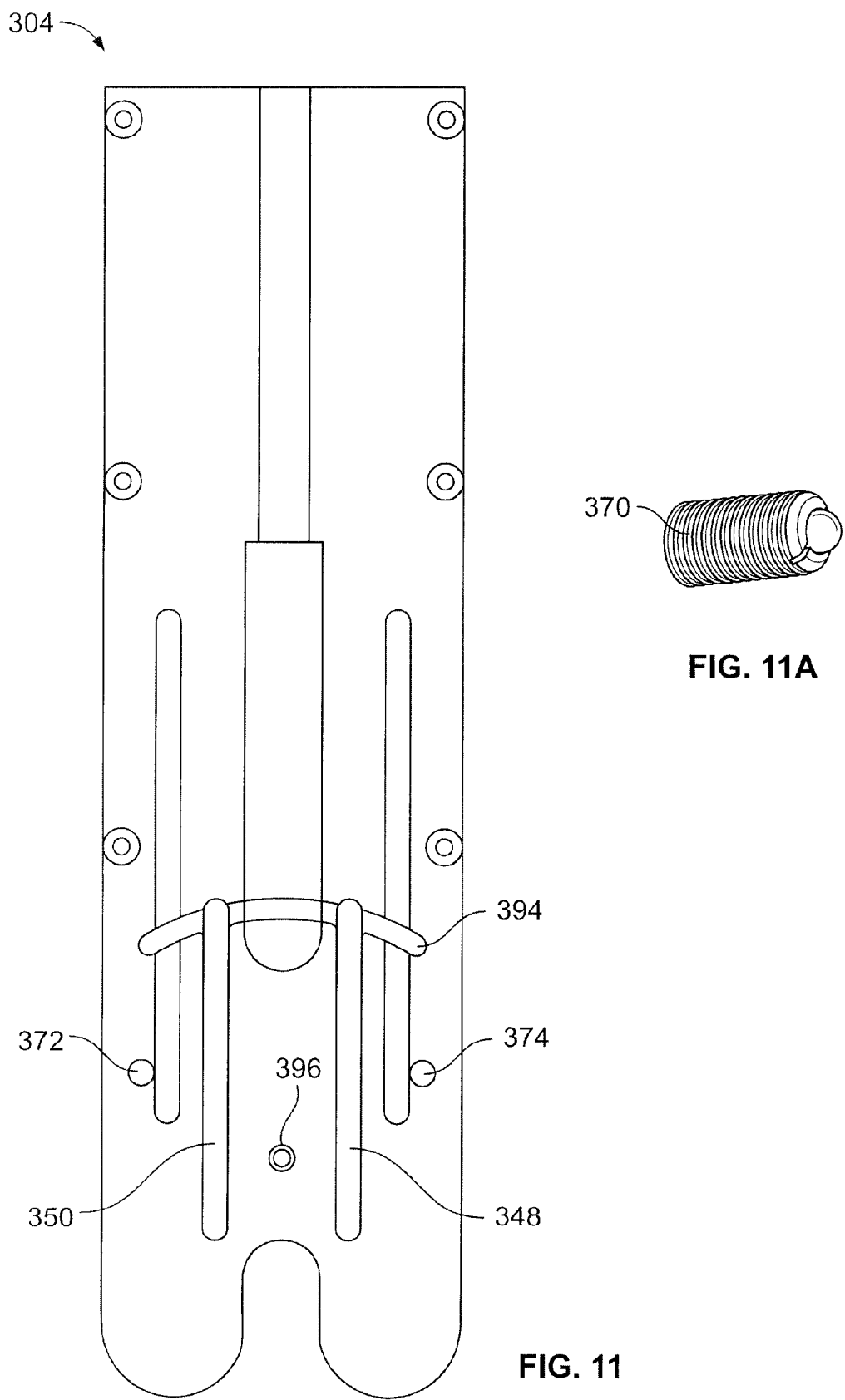
FIG. 11 is a cover intended to be joined to the body plate of FIG. 10.
FIG. 11A is a perspective view of a spring loaded detent intended to be mounted in the cover of FIG. 11.

Turning to the front of the driver in FIG. 9B, it is seen that the front surface 364 of the driver has standing ribs 366 and 368 that mesh with slots in body cover 304 of application section 102 (FIG. 11). Additionally, the outer edges of the back surface of each of the arms has been undercut to provide open clearance slots 370 and 372 for detents 370 (FIG. 11A) that hold the locking clips in place in the apparatus before they are applied.

Turning now to FIG. 10, the body plate 374 of application section 102 is shown. The body plate includes a central slot 376 permitting up-and-down movement of the push rod and a cut-out 378 for receiving the driver 138 in its topmost unengaged position, in which the top edge 380 of the driver (FIGS. 9A-9B) engages the top edge 382 of the cavity under the urging of the spring loading of the controller arm.

This spring loading is provided by a coil spring 384 that encircles rod 106 between the top edge 386 of application section 102 and a collar 388, as illustrated in FIGS. 2 and 3. In order to operate grasping and fastening apparatus 100, the user places application section 102 in position and presses down on knob 390 at the proximal end of rod 106 to move the rod downwardly from the resting position shown in FIGS. 2 and 3 until the operation of the apparatus is completed. The user then permits the rod to return to its resting position under the force of spring 384.

FIG. 11 shows body cover 304, as viewed from the inside. The body cover includes a clearance slot 392 for the push rod corresponding to slot 376 in back plate 372. An arcuate through slot 394 is formed in the body cover to receive guide pins 333 of the grabber arms to guide the arms in the desired pivoting motion. The body cover also has a threaded pivot bore 396 for attaching pivot pin 332. Additionally, parallel slots 398 and 400 are located adjacent the elongated outer edges 402 and 404 of the body cover. These slots receive ribs 366 and 368 of the driver to ensure that it moves up and down within the grabber body consistently and in a direction parallel to the longitudinal axis and the elongated sides of the device. Additionally, there are parallel through slots 348 and 350 in the body cover positioned inside of the outer slots, spaced apart a distance corresponding to the spacing between threaded bores 360 and 362 in ears 356 and 358 of the driver to accept link pins 344 and 346. Finally, spring loaded detents 370 (FIG. 11A) are fitted into threaded bores 372 and 374 in the body cover. These detents cooperate with flat back faces 210 and 212 of plate 186 to prevent premature clip release thereby ensuring that the leading clip is in position ready to be applied when needed. Thus, when driver 138 engages the leading clip, it initially pushes the clip past the resistance provided by the spring loaded detents. Open slots 402 and 404 in driver 138 (FIG. 9B) permit the driver to move downwardly past the detents without interference.

The operation of grasping and fastening apparatus 100 may proceed as described below, in a continuous even motion from step 1 through step 6.

1. A series of clips corresponding to leading clip 114 are loaded in magazine 104, and move downwardly in the magazine until the leading clip is resting in application section 102 against detents 370.
2. Relatively rigid, generally cylindrical articles are provided on a supporting surface.
3. Grasping and fastening apparatus 100 is positioned over the articles so that the articles generally reside in the space between fingers 116 and 118, with the distal ends 120 and 122 of the fingers resting on the supporting surface.
4. The operator then presses down upon knob 390, moving control rod 106 downwardly and causing clip driver 138 to move downwardly and link pins 344 and 346 also to move downwardly in slots 348 and 350 of body cover 304, while engaging slots 308 of the grabber arms. This causes the grabber arms to pivot inwardly and engage the bottommost article resting on the supporting surface. The articles are contained in the space between the grabber arms as the grabber arms lift the apparatus away from the supporting surface.
5. As the control arm continues to be pressed downwardly, driver arms 140 and 142 of driver 138 engage abutment portions 154 and 156 of leading clip 114, causing the leading clip to move past detents 370 until it engages the topmost article. As the locking clips come into engagement with the tubing, the continued downward movement of driver 138 causes the side members of clip 114 to pivot inwardly through the stages depicted in FIGS. 4B-4D until the clip is locked about the members as shown in FIG. 4D.
6. The user then releases the apparatus by permitting the control arm to return to the position depicted in FIGS. 2 and 3 under the force of spring 384, lifts the apparatus away from the now clipped intersection thereby releasing the clips and articles, and moves to the next location requiring application of a clip.

While the apparatus of the present invention is illustrated as manually operable, the control arm may be supplied with an automatic hydraulic or pneumatic driver which would move the control arm through the motion described above, albeit under hydraulic or pneumatic force initiated through a separate control or switch. In yet another alternative embodiment, a crank-up spring loaded system may be provided by which the operator loads up a spring with a potential application force and then releases that force to drive the control arm through the operation as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for confining in a fastening member an article resting on a surface comprising:
    a housing having a cavity for holding an open fastening device having two movable arms and a control arm linked to first and second members, the control arm being movable between a start position and an end position to successively actuate the first and second members,
    the first member being adapted to contain and lift the article into position to await delivery of the open fastening device and
    the second member having two driver arms that interact with the movable arms of the fastening device to move the open fastening device into engagement with the article and then to close the fastening device about the article.

2. The apparatus of claim 1 in which the first member includes grabber arms with inwardly directed distal ends to engage the article and hold it in a capture area between the grabber arms located above the inwardly directed distal ends.

3. The apparatus of claim 2 in which the grabber arms include V-shaped slots with first and second legs and link pins adapted to move downwardly in response to operation of a control rod, the link pins first engaging the first leg of the slot to pivot the grabber arm inwardly to a closed position and then engaging the second leg of the slot to maintain the grabber arms in the closed position.

4. The apparatus of claim 2 in which the inwardly directed distal ends of the grabber arms are chiseled.

5. The apparatus of claim 2 in which the inwardly directed distal ends of the grabber arms are radiused.

6. The apparatus of claim 2 including at least two adjacent articles to be secured and at least one of the articles rests on the surface and the inwardly directed distal ends of the grabber arms engage the article resting on the surface while the remaining articles are contained in the capture area between the grabber arms.

7. The apparatus of claim 3 in which the grabber arms are attached to the housing for pivotal movement.

8. The apparatus of claim 3 in which the grabber arms pivot through a lifting position in which the grabber arms extend beyond the distal end of the housing to lift the housing from the surface as the grabber arms pass through the lifting position.

9. The apparatus of claim 7 in which the grabber arms are provided with a projecting guide pin and the housing includes an arcuate slot for receiving the guide pin, the movement of the guide pin in the slot guiding the pivotal movement of the grabber arms.

10. The apparatus of claim 1 in which the first member is also adapted to raise the apparatus away from the surface.

11. The apparatus of claim 1 in which the first member is also adapted to raise the apparatus away from the surface as the open fastening device is being delivered to the article.

12. The apparatus of claim 11 in which the grabber arms each have an outer radiused corner to engage the surface as the grabber arms move through the lifting position.

13. The apparatus of claim 1 in which the housing includes an open cavity at its distal end for receiving the article.

14. The apparatus of claim 13 in which the open cavity is radiused to accept a tubular article.

15. The apparatus of claim 1 in which the distal end of the housing includes two fingers for supporting the apparatus against the surface.

16. The apparatus of claim 15 in which the distal ends of the fingers are curved.

17. The apparatus of claim 15 in which the distal ends of the fingers have flat ends.

18. The apparatus of claim 1 in which the apparatus includes a magazine for holding a plurality of fastening clips to be fed into the apparatus one-by-one as needed to confine successive articles.

19. The apparatus of claim 1 in which the control arm includes an elongated rod adapted to move in a generally vertical direction relative to the surface to actuate the first and second members.

20. The apparatus of claim 19 in which the rod includes a knob at its proximal end and a spring mounted between the knob and the housing to return the rod to its starting location following the closing of the fastening device about the article.

21. The apparatus of claim 1 in which the control arm is operable by a hydraulic driver that moves the arm under hydraulic force.

22. The apparatus of claim 1 in which the control arm is operable by a pneumatic driver that moves the arm under pneumatic force.

23. The apparatus of claim 1 in which the control arm is operable by loading a spring with a potential application force and then releasing the application force to drive the control arm to actuate the first and second members.

24. An apparatus for confining in a fastening member having two pivoting arms at least two articles resting on a surface, the apparatus comprising:
    a housing having a cavity for holding an open fastening device and a control arm linked to first and second members, the control arm being movable between a start position and an end position to successively actuate the first and second members,
    the first member including two pivoting grabber arms with inwardly directed distal ends to engage the article in a capture area between the grabber arms located above the inwardly directed distal ends to contain and lift the articles into position to await delivery of the open fastening device, and
    the second member being adapted to linearly move the open fastening device into engagement with the article and then to pivot the fastening device arms into a closed position to confine the article.

25. The apparatus of claim 24 in which the grabber arms pivot through a lifting position in which the grabber arms extend beyond the distal end of the housing.

* * * * *